US012623825B2

(12) United States Patent
Moura

(10) Patent No.: US 12,623,825 B2
(45) Date of Patent: May 12, 2026

(54) PLASTIC FILM PACKAGE WITH ADHESIVE CLOSURE FOR WRAPPING VARIOUS PRODUCTS

(71) Applicant: Herman Brian Elias Moura, Sorocaba (BR)

(72) Inventor: Herman Brian Elias Moura, Sorocaba (BR)

( * ) Notice: Subject to any disclaimer, the term of this patent is extended or adjusted under 35 U.S.C. 154(b) by 222 days.

(21) Appl. No.: 18/684,521

(22) PCT Filed: May 31, 2022

(86) PCT No.: PCT/BR2022/050184
§ 371 (c)(1),
(2) Date: Feb. 16, 2024

(87) PCT Pub. No.: WO2023/019330
PCT Pub. Date: Feb. 23, 2023

(65) Prior Publication Data
US 2025/0222661 A1     Jul. 10, 2025

(30) Foreign Application Priority Data

Aug. 17, 2021     (BR) .......................... 1020210162422

(51) Int. Cl.
*A01F 15/07*     (2006.01)
*B32B 3/02*     (2006.01)
(Continued)

(52) U.S. Cl.
CPC .......... *B65D 71/063* (2013.01); *A01F 15/071* (2013.01); *B32B 3/02* (2013.01);
(Continued)

(58) Field of Classification Search
None
See application file for complete search history.

(56) References Cited

U.S. PATENT DOCUMENTS

| 5,983,594 A | 11/1999 | Forman | |
| 10,257,986 B1 * | 4/2019 | Porter | C09J 7/40 |

(Continued)

FOREIGN PATENT DOCUMENTS

| BR | 102015015317 | 2/2018 | |
| CN | 110127135 A * | 8/2019 | B65B 61/00 |

(Continued)

OTHER PUBLICATIONS

Machine Translation of CN110844323A, Feb. 2020 (Year: 2020).*
Machine Translation of CN112210304A, Jan. 2021 (Year: 2021).*

*Primary Examiner* — Jeffrey A Vonch
(74) *Attorney, Agent, or Firm* — B. Aaron Schulman, Esq.; Stites & Harbison, PLLC

(57) ABSTRACT

Obtained from a thermoplastic film (1), having the outer side (1A) with corona treatment and distributes breakable lines (2), between which segments (3A-3N) are configured, each of which includes a signaling mark (4) of the "zero" position of each package, a first layer of medium adhesion adhesive (5), two (second and third) layers of high adhesive adhesion (6A) and (6B), between which is that breakable line (2); It also includes a protective/guide strip (7) that extends over the two layers of high-adhesion adhesives (6A) and (6B), where one of its ends is permanently glued, while its opposite end is folded into a hook (8) which, in turn, is siliconized on the face that fits over the high-adhesion adhesive layer (6B).

13 Claims, 12 Drawing Sheets

(51) Int. Cl.

| | |
|---|---|
| *B32B 3/08* | (2006.01) |
| *B32B 3/24* | (2006.01) |
| *B32B 3/26* | (2006.01) |
| *B32B 7/022* | (2019.01) |
| *B32B 7/05* | (2019.01) |
| *B32B 7/06* | (2019.01) |
| *B32B 7/14* | (2006.01) |
| *B32B 27/08* | (2006.01) |
| *B32B 27/16* | (2006.01) |
| *B32B 27/32* | (2006.01) |
| *B65D 65/14* | (2006.01) |
| *B65D 71/06* | (2006.01) |
| *C09J 7/22* | (2018.01) |
| *C09J 7/24* | (2018.01) |
| *C09J 7/30* | (2018.01) |
| *C09J 7/40* | (2018.01) |
| *B29C 63/02* | (2006.01) |
| *B29C 65/48* | (2006.01) |
| *B29C 65/54* | (2006.01) |
| *B29C 65/80* | (2006.01) |
| *B65B 11/00* | (2006.01) |
| *B65B 25/02* | (2006.01) |
| *B65B 33/00* | (2006.01) |
| *B65B 41/12* | (2006.01) |
| *B65D 33/20* | (2006.01) |
| *B65D 63/10* | (2006.01) |
| *B65D 65/22* | (2006.01) |
| *B65D 75/70* | (2006.01) |

(52) U.S. Cl.
CPC .............. *B32B 3/085* (2013.01); *B32B 3/266* (2013.01); *B32B 7/022* (2019.01); *B32B 7/06* (2013.01); *B32B 7/14* (2013.01); *B32B 27/08* (2013.01); *B32B 27/16* (2013.01); *B32B 27/32* (2013.01); *B65D 65/14* (2013.01); *C09J 7/22* (2018.01); *C09J 7/243* (2018.01); *C09J 7/405* (2018.01); *A01F 2015/0745* (2013.01); *B29C 63/02* (2013.01); *B29C 65/48* (2013.01); *B29C 65/54* (2013.01); *B29C 65/80* (2013.01); *B32B 7/05* (2019.01); *B32B 2323/04* (2013.01); *B32B 2553/00* (2013.01); *B65B 11/00* (2013.01); *B65B 25/02* (2013.01); *B65B 33/00* (2013.01); *B65B 41/12* (2013.01); *B65D 33/20* (2013.01); *B65D 63/10* (2013.01); *B65D 65/22* (2013.01); *B65D 75/70* (2013.01); *B65D 2565/385* (2013.01); *B65D 2565/386* (2013.01); *B65D 2571/0066* (2013.01); *B65D 2571/00672* (2013.01); *B65D 2571/00864* (2013.01); *B65D 2571/0087* (2013.01); *B65H 2701/1944* (2013.01); *C09J 7/30* (2018.01); *C09J 7/401* (2018.01); *C09J 2203/00* (2013.01); *C09J 2301/122* (2020.08); *C09J 2301/18* (2020.08); *C09J 2301/204* (2020.08); *C09J 2301/208* (2020.08); *C09J 2301/21* (2020.08); *C09J 2423/046* (2013.01); *Y10S 428/9033* (2013.01); *Y10S 428/906* (2013.01); *Y10T 428/1457* (2015.01); *Y10T 428/1471* (2015.01); *Y10T 428/1476* (2015.01); *Y10T 428/1481* (2015.01); *Y10T 428/15* (2015.01); *Y10T 428/24314* (2015.01); *Y10T 428/24752* (2015.01); *Y10T 428/24777* (2015.01); *Y10T 428/2486* (2015.01); *Y10T 428/24942* (2015.01)

(56) References Cited

U.S. PATENT DOCUMENTS

| | | | | |
|---|---|---|---|---|
| 11,142,382 | B1 * | 10/2021 | Hayes | C09J 7/20 |
| 2004/0121103 | A1 * | 6/2004 | Mass | B65H 18/28 |
| | | | | 428/40.1 |
| 2005/0034429 | A1 * | 2/2005 | Mass | B31D 1/0062 |
| | | | | 428/40.1 |
| 2005/0155714 | A1 * | 7/2005 | Adams | B65H 19/10 |
| | | | | 242/555.3 |
| 2011/0172073 | A1 | 7/2011 | Chen | |
| 2013/0221078 | A1 * | 8/2013 | Skelton | B65D 65/14 |
| | | | | 229/87.01 |
| 2014/0263590 | A1 * | 9/2014 | Skelton | B65D 65/14 |
| | | | | 229/87.01 |
| 2014/0352263 | A1 * | 12/2014 | Harchol | B65B 25/02 |
| | | | | 242/160.4 |
| 2016/0151994 | A1 * | 6/2016 | Castillo | B32B 7/14 |
| | | | | 428/41.8 |
| 2016/0177135 | A1 * | 6/2016 | Allen | C08J 5/18 |
| | | | | 428/196 |
| 2018/0084729 | A1 * | 3/2018 | Porter | A01F 15/071 |
| 2021/0070514 | A1 * | 3/2021 | Zhu | B65D 65/22 |
| 2021/0300649 | A1 * | 9/2021 | Huang | A01F 15/071 |
| 2022/0227553 | A1 * | 7/2022 | Zhu | B65H 21/00 |
| 2024/0254370 | A1 * | 8/2024 | Rohde | C09J 7/29 |

FOREIGN PATENT DOCUMENTS

| | | | | | |
|---|---|---|---|---|---|
| CN | 209506549 | U | * | 10/2019 | |
| CN | 110844323 | A | * | 2/2020 | B65D 65/04 |
| CN | 211281576 | U | * | 8/2020 | |
| CN | 111761899 | A | * | 10/2020 | B29C 55/28 |
| CN | 112210304 | A | * | 1/2021 | B23K 26/402 |
| CN | 112722574 | A | * | 4/2021 | C09J 7/20 |
| CN | 112744633 | A | * | 5/2021 | B65B 11/02 |
| CN | 112793923 | A | * | 5/2021 | B65B 25/02 |
| CN | 112793924 | A | * | 5/2021 | B65D 65/22 |
| CN | 113086413 | A | * | 7/2021 | B65D 65/10 |
| CN | 113200239 | A | * | 8/2021 | B65D 65/22 |
| GB | 1000697 | | | 8/1965 | |
| GB | 2075457 | A | * | 11/1981 | B65D 75/66 |
| JP | H10273201 | | | 10/1998 | |
| WO | WO-2020232656 | A1 | * | 11/2020 | B65H 18/028 |
| WO | WO-2021110132 | A1 | * | 6/2021 | B29D 7/01 |
| WO | WO-2022156410 | A1 | * | 7/2022 | B65D 65/38 |

* cited by examiner

PLASTIC FILM PACKAGE WITH ADHESIVE CLOSURE FOR WRAPPING VARIOUS PRODUCTS

FIELD OF INVENTION

The present invention is related to the following patent applications of the same applicant: BR102015015317-1 filed on 24 Jun. 2015, BR102020010957-0 filed on 29 May 2020 and BR102021008933-4 filed on 7 May 2021 cited herein.

In the same way, the present Invention refers to a package in the form of plastic film with variable length and width, as well as its ends have means so that several units can be held interconnected with each other forming a "continuous plastic film" that is prepared in reel and all units also have their ends perforated and with cooperating adherent means to be applied by a dedicated device and subsequent final closure of each package after it wraps or wraps the product.

The packaging in question, only varying its dimensioning, is likely to be used as wrapping of various products and raw materials, especially those of serial production, such as: bales in general, coils of various materials, household appliances, electronic devices and components, furniture, boxes, suitcases, paintings or engravings (works of art), mattresses, bundled pillows, channels and conductors in bars, Bundle of electrical wires into rolls, fabric coils, various containers (bottles and jars), food boxes (packaging).

Therefore, the packaging in question constitutes a plastic film wrapper that can be wrapped by rolling any product, regardless of the format, wrapping it with one or more turns and, at the end, the end of the film is fixed by an adhesive layer, stabilizing the entire wrapping.

STATE OF THE ART

In addition to the documents mentioned above, there are other different packages prepared in the form of continuous plastic films, as taught, for example, the documents: GB1000697, US2011/0172073 A1, JPH10273201, U.S. Pat. No. 5,983,594 and BR102015015317.

Therefore, there are currently several different ways adopted to wrap a product or several products at once using continuous plastic films. One well-known way is the use of "heat shrink or heat shrink" film. Another way is known as "plastic film" simply. The first wraps the product with some slack, and after applying heat, the film shrinks and dents against the product. In the second way, the film is actually very thin and fits over the product easily. Of course, there are many variations for the material in both cases, depending on the product to be wrapped.

On the other hand, there are also plastic films with variable thicknesses prepared in rolls used to wrap different products and, in this case, the film is unwound and cut to the predetermined length and its ends have means with adherent resources for final closure of the package.

In some cases, there are also continuous plastic films with varying widths and thicknesses prepared in rolls used to wrap different products and, in this case, the film is unwound and cut to length with a manual stylus, as well as its final closure is carried out with adhesive tape at various points, including in the longitudinal direction to consolidate the wrapping.

There is no doubt that the well-known ways to wrap miscellaneous items have a certain efficiency, however some disadvantages are noted, that is, the well-known packages with adherent media at their ends have limited application, as they are specifically designed for certain applications. On the other hand, in other well-known packages, we can highlight other disadvantages, mainly the lack of control over the amount of film used (usually more than necessary). As the cut is not regular and the width of the commercial tapes is narrow, it is necessary to pass several adhesive tapes to secure all the ends of the irregular cut, and to consolidate the wrapping, pass other adhesive tapes in the longitudinal direction. Another disadvantage is that all the film tensioned during the wrapping process is lost at the time of cutting with the stylus, causing the wrapping to unpack and difficulty in finishing it.

It is also worth noting the fact that some common packages, especially baling packages, do not have efficient means to neutralize baling stresses, which markedly reduces the time in which the set is exposed in the field, because, at this stage, the time of exposure to bad weather is a critical factor to maintain the integrity of the package.

On the other hand, the usual packaging does not have characteristics specially developed so that it can be produced in "green plastic", because this, as it is known, is a practical and economical alternative for the packaging industries to preserve the environment, since green plastic is a polyethylene produced from ethanol from different plants. Such as: sugarcane, cassava, potatoes, corn, sugar beets and others of renewable origin, 100% recyclable and does not contribute to global warming.

OBJECTIVES OF THE INVENTION

In view of the above circumstances and with the aim of overcoming them, the present packaging was created in the form of plastic film with completely different technical characteristics in relation to the state of the art, that is:

this packaging includes means to add advantages in relation to the applicant's previous requests, BR102015015317-1, BR102020010957-0 and BR102021008933-4, i.e., it presents construction details specially created to neutralize the stresses of the baling, which allows for a considerable increase in the time in which the whole is exposed in the field, since, at this stage, the time of exposure to the elements, As already stated, it is a critical factor in maintaining the integrity of the packaging.

It can be produced in "green plastic", offering an efficient alternative for preserving the environment, since green plastic, as already mentioned, is a polyethylene produced from ethanol from different plants, consequently, of renewable origin, 100% recyclable and does not contribute to global warming.

Each package is a previously prepared plastic film with thickness, width and length according to the product to be wrapped;

Each unit has a strip for consolidation of the wrapping;

Each package or film already comes with a breakable zone or cutting guide with precision and the closing adhesive is already positioned and without the need to remove the protective liner (layer);

several packages are interconnected with each other and are prepared in reels with several units;

when a unit is removed from the roller, its separation occurs by means of a weakened transverse line that is easily broken at the desired time, leaving the next unit ready to be used;

The wrapping is ready in less time, with a good finish and a better look, including no waste of material; and With the packaging thus prepared in a roll, it is possible to be previously defined with many variations in the plastic film, in the sizing, in the type of adhesive used, as well as the customization of the plastic film, all according to the product to be wrapped.

DESCRIPTION OF THE DRAWINGS

For a better understanding of this Invention, a detailed description of it is made below, making references to the attached drawings, where all the figures are schematic and do not follow a scale, that is, the laminar parts (adhesive layers and film) are shown with exaggeratedly large thicknesses, as well as the length of each package was exaggeratedly reduced. All this for better visualization and understanding of the parts that make up each package, and the.

DETAILED DESCRIPTION OF THE INVENTION

Figure 1:
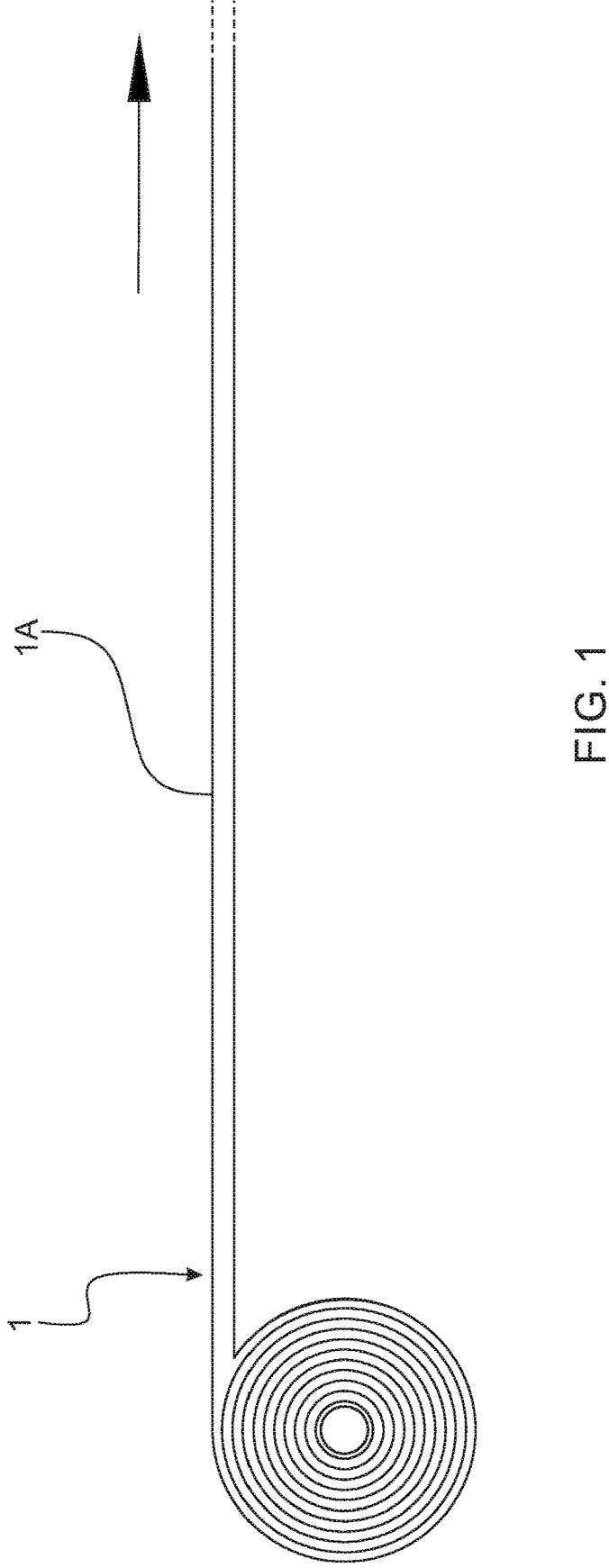
FIG. 01 represents a schematic lateral view of a continuous thermoplastic film, consistent with the product to be packaged.
Figure 2:
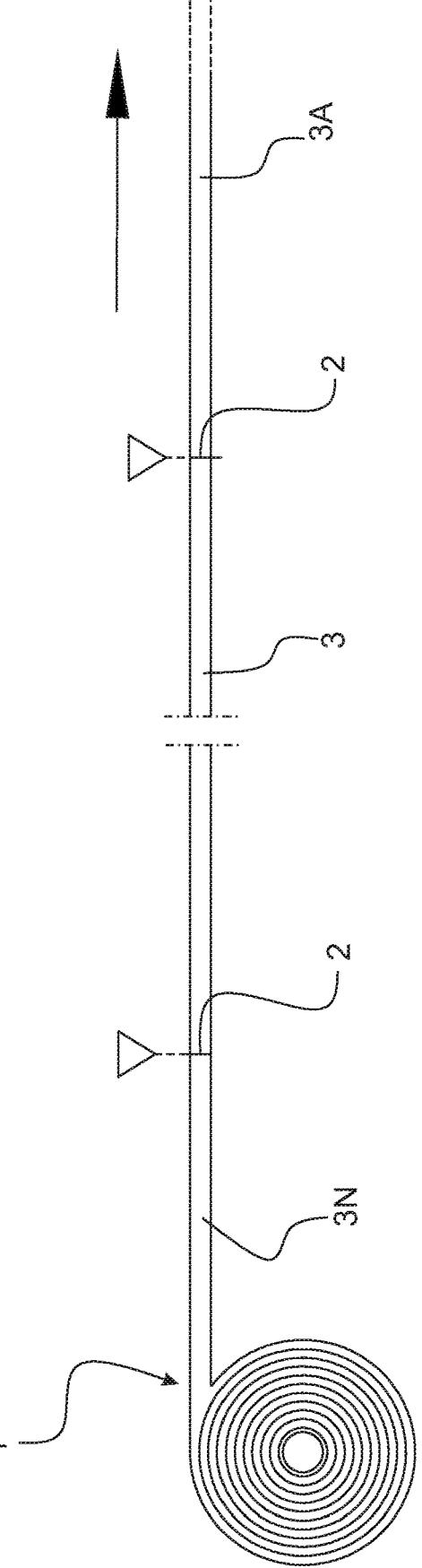
FIG. 02 illustrates the position of breakable lines that promote transverse mechanical embrittlement of the thermoplastic film and determine the length of each package.
Figure 3:
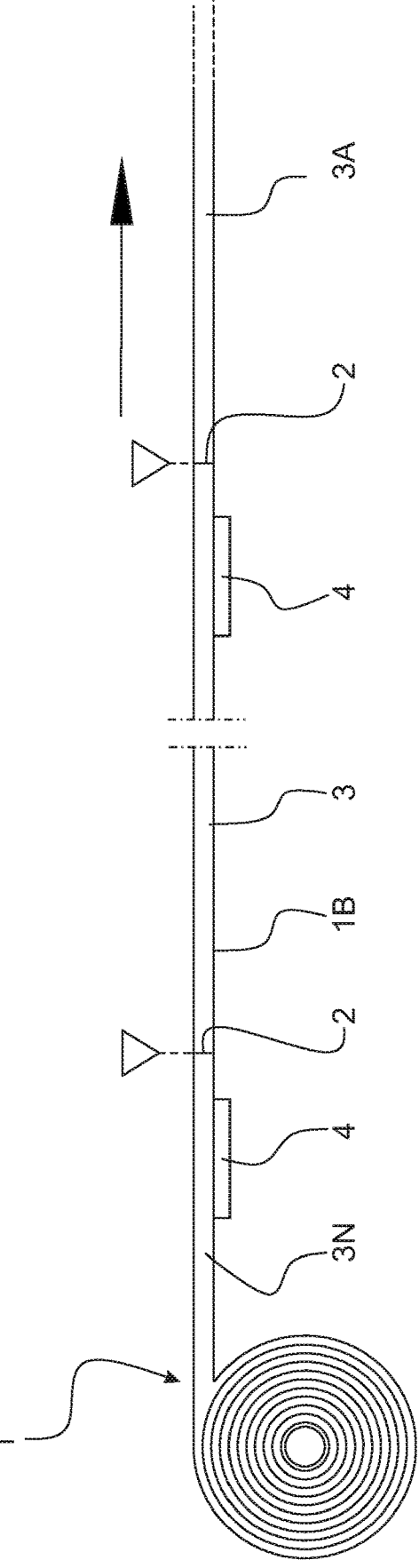
FIG. 03 represents the application of marking marks from the "zero" position of each package, through labels that offer barriers against the passage of light applied on the corresponding side of the thermoplastic film.
Figure 4:
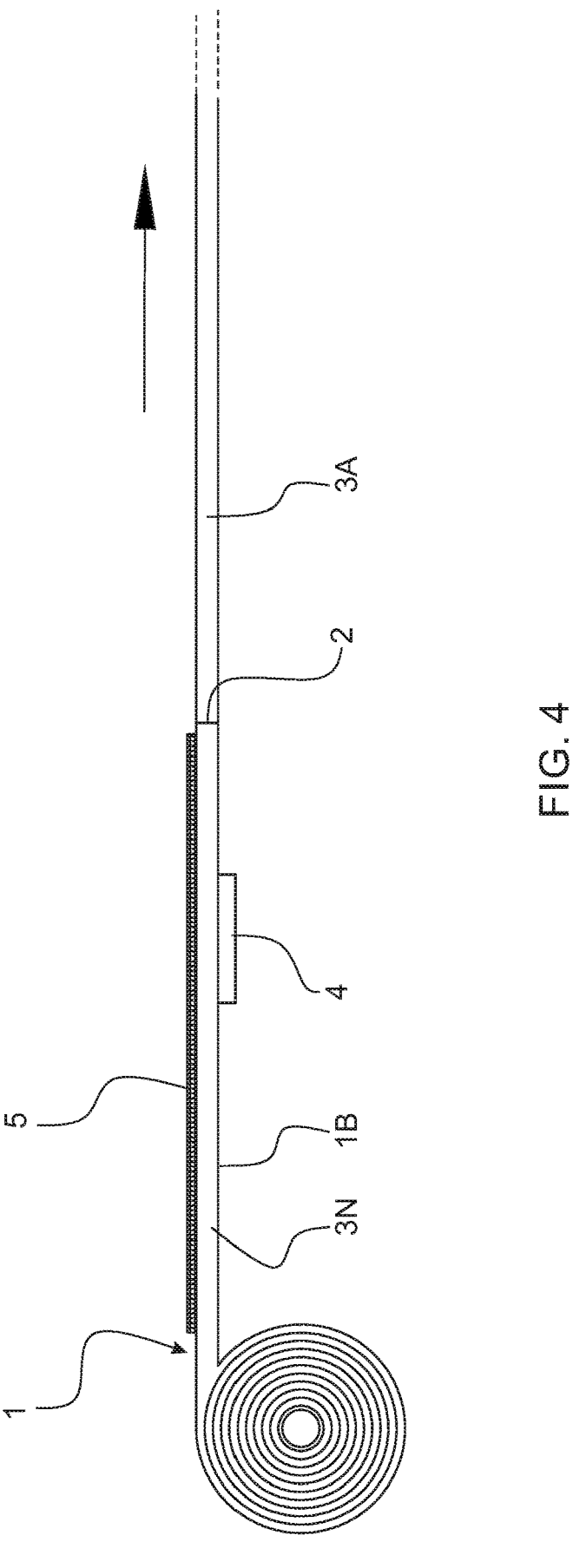
FIG. 04 is a view showing the arrangement of a first adhesive layer of medium adhesion positioned on the upper side of the thermoplastic film and with an initial margin next to the transverse mechanical embrittlement region.
Figure 5:
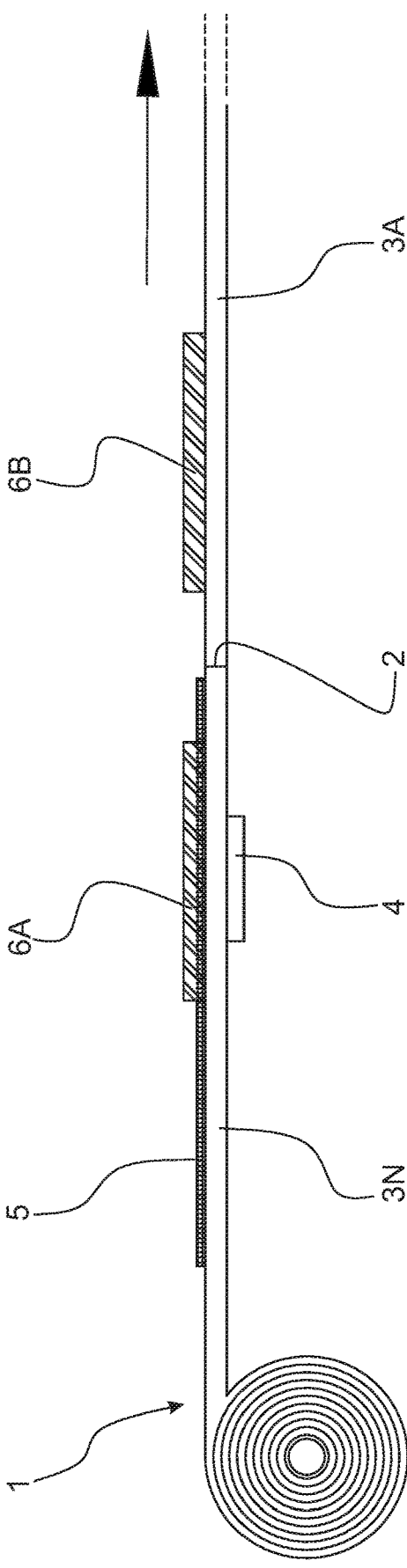
FIG. 05 shows a second and a third adhesive layers of high adhesion next to the region of transverse mechanical embrittlement.
Figure 7:
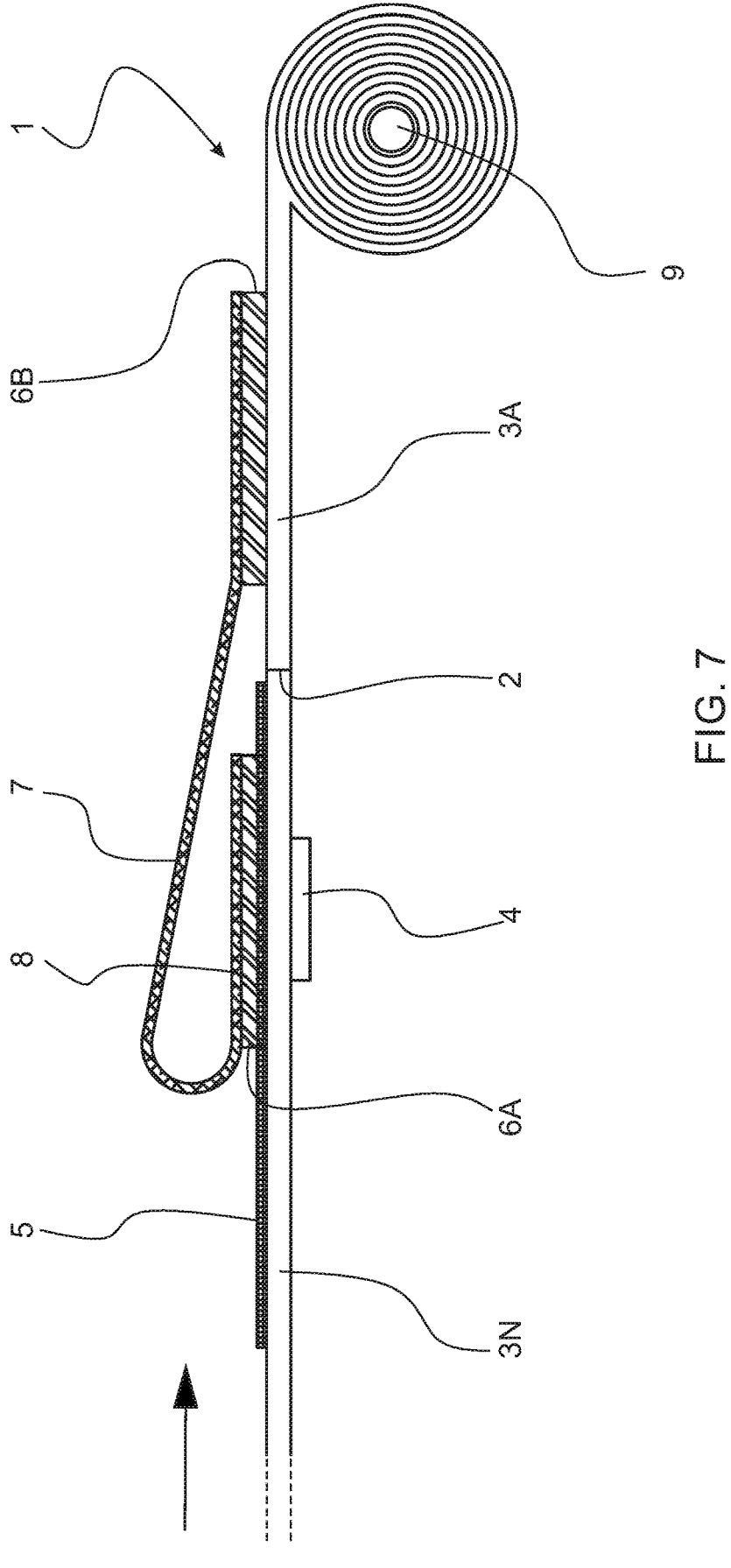
FIG. 07 is a view that represents the final phase of the construction of the continuous coil-shaped packaging accommodated in a thermoplastic tube.

According to these illustrations and their details, the present Invention, PLASTIC FILM PACKAGING WITH ADHESIVE CLOSURE FOR WRAPPING MISCELLANEOUS PRODUCTS, IN THE SAME WAY AS IN THE PREVIOUS ORDERS BR102015015317-1, BR102020010957-0 AND BR102021008933-4, COMPRISES, AS ILLUSTRATED IN FIG. 1:

a thermoplastic film (1), continuous, with a width and length consistent with the product to be packaged, where the external side (1A) has the surface tension controlled by the usual corona treatment process that leaves the surface prepared for adhesion of complements;

(FIG. 2) the continuous plastic film (1) distributes transversely and equidistantly several breakable lines (2), between which equal segments (3A-3N) are configured, each corresponding to a package;

(FIG. 3) each segment (3A-3N) includes at least one marking mark (4) of the "zero" position of each package, through a label that offers a barrier against the passage of light applied on the corresponding side (1B) of the thermoplastic film (1) with an initial margin next to each breakable line (2) and in other necessary places;

(FIG. 4) the initial end of each segment (3A-3N) receives a first layer of medium-adhesion adhesive (5) extending from the corresponding breakable line (2);

(FIG. 5) a second, shorter-length layer of high-adhesion adhesive (6A) arranged over the first layer of medium-adhesion adhesive (5);

(FIG. 5) a third layer of high-adhesion adhesive (6B) arranged over the corresponding end of each segment (3A-3N), between such second and third layers of high-adhesion adhesives (6A) and (6B) that breakable line (2); and (FIG. 6) a protective strip/guide (7) of plastic film type liner, rectangular, with sufficient length and width to extend over the second and third layers of high adhesion adhesives (6A) and (6B), and on the side of the third layer of high adhesion adhesive (6B) said protective strip/guide (7) is permanently glued, while its opposite end is folded downwards and inwards forming a tip interposed in a hook (8) which, in turn, is siliconized on the face that fits over the second layer of high adhesion adhesive (6A), covering it entirely, keeping it protected until the moment of use and closure of the package;

FIG. 7 represents the final phase of the construction of the packaging where the units are kept interconnected by the breakable line (2) forming a continuous set of units that, at the end, are prepared in a coil accommodated in a thermoplastic tube (9).

Figure 8:
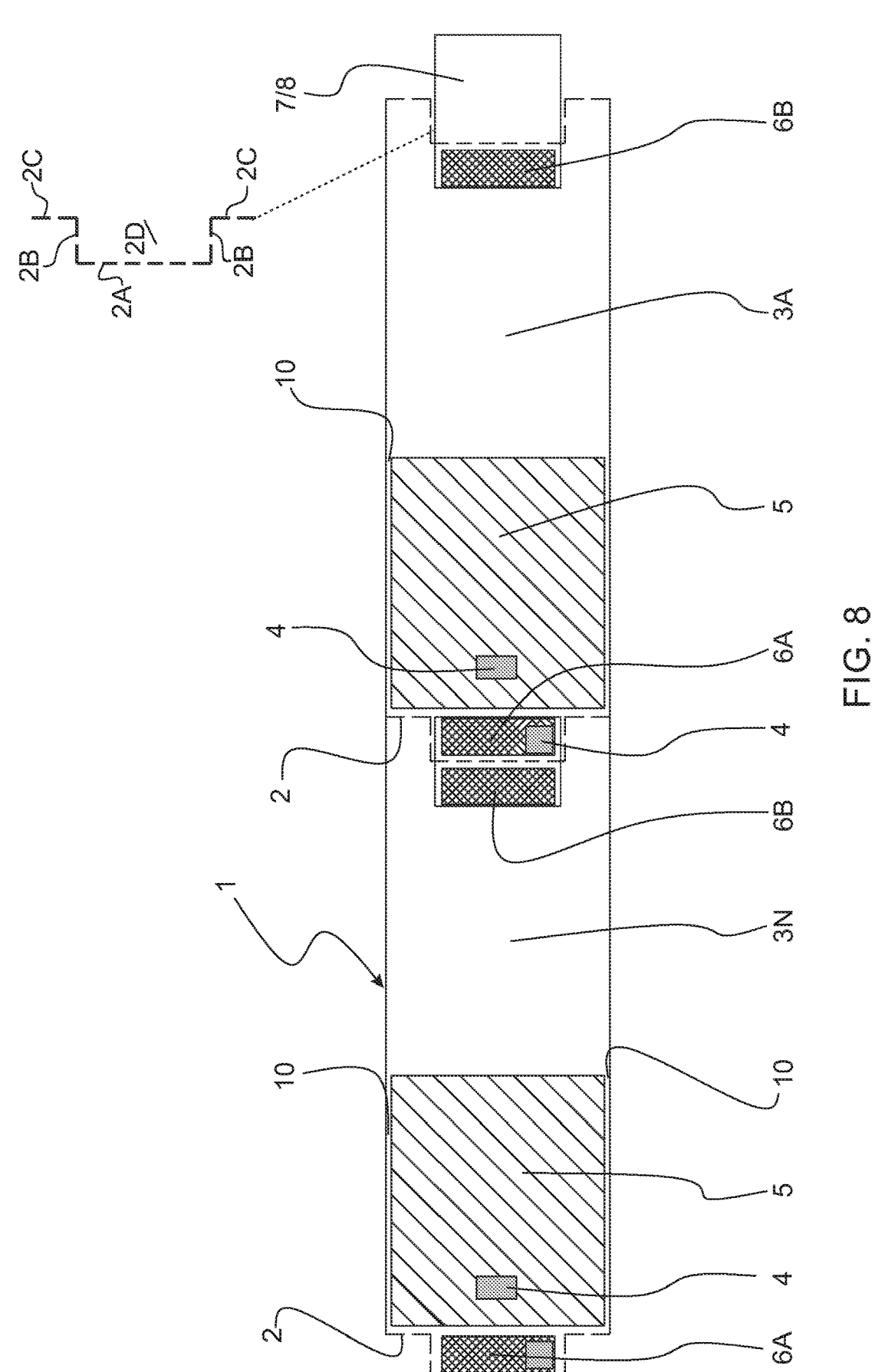
FIG. 08 shows a "blueprint" view of the packages in a continuous film.

With respect to FIG. 8, in a preferred construction, the first layer of medium-adhesion adhesive (5) ends before the side edges in the corresponding segment (3), resulting in non-adhesive side stripes (10).

The first layer of medium-adhesion adhesive (5) extends longitudinally according to a length of 30% to 60% of the segment length (3).

The second and third layers of high-adhesion adhesives (6A) and (6B) are centered and extend transversely according to an extension of 30% to 90% of the segment width (3A-3N), while in the longitudinal direction they extend according to an extension of 5% to 15% of the segment length (3A-3N).

Figure 6:
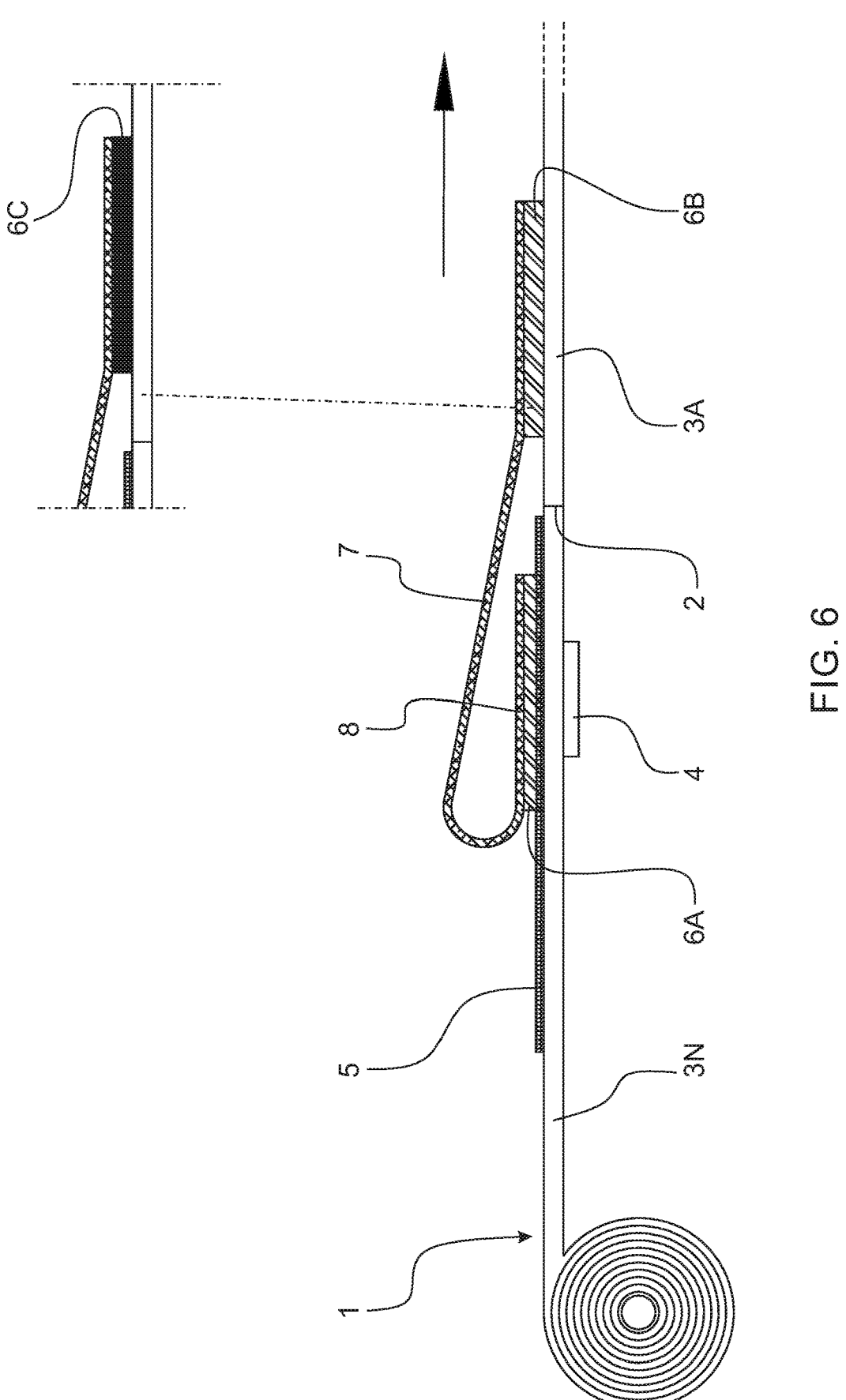
FIG. 06 represents the plastic film with a component also of a thermoplastic protective film of the "liner" type and an enlarged detail, highlighting a variation of fixation of one of the ends of the referred liner.

In another preferred construction, shown in FIG. 6, the permanent fixation of the corresponding end of the protector/guide strip (7) is performed by thermo-welding strip (6C) instead of the third layer of high-adhesion adhesive (6B).

In the above-mentioned applications, BR102015015317-1, BR102020010957-0 and BR102021008933-4, several tests were carried out with the continuous plastic film (1) with regard to the breakable line (2) and, in the end, it was concluded that some variations provide desired and effects suitable for the dimensional variations of the plastic film (1), notably with regard to length, width and thickness, Also including details of the product to be packaged. In these and other cases, it was possible to determine some variations for the breakable line (2), from a simply straight condition to other conditions that combine straight sections with angular ends. Such variations resulted in specific effects on the plastic film (1), modifying the force and speed of the rupture and, consequently, each variation was adequate according to the thicknesses, widths and lengths of the plastic film for each application, also enabling better use of the units, i.e., significant reduction of leftovers.

After several carried out, it was tests concluded that the constructivity of the film could be further improved with regard to the cutting line (2) and the positioning of the second and third layers of high adhesion adhesives (6A) and (6B), logically with the aim of further improving the operation of the packaging and adding advantages compared to the applicant's previous applications, BR102015015317-1, BR102020010957-0 and BR102021008933-4.

The modification proposed in the present invention, as already mentioned, presents construction details specially created in the cutting line (2) to neutralize the stresses of the baling, which allows to considerably increase the time in which the set is exposed in the field, since, at this stage, the time of exposure to the elements is a critical factor to maintain the integrity of the package.

Thus, FIG. 8 shows another preferred construction for the breakout line (2). This figure also represents the "plant" format of the continuous set of units, through which it can be seen that the breakable line (2) is characterized by involving only the second high-adhesion adhesive layer (6A) and, for this purpose, extends transversely, defining an intermediate straight stretch (2A) between said second and third layers of high-adhesion adhesive layers (6A) and (6B), then such an intermediate section (2A) has its ends perpendicularly oriented to the same side in parallel sections (2B) after which they deflect again outwards and in the transverse direction (2C) forming an enveloping section (2D) that surrounds the second layer of high adhesive adhesion (6A) at the end of each packaging segment (3A-3N) so that (see FIG. 9) when the first segment (3A) is pulled, the corresponding (front) end of the protective strip/guide (7) is detached from the second high-adhesion adhesive layer (6A), while its other end (rear) remains permanently attached to the third layer of high-adhesion adhesive (6B).

Such construction, in addition to facilitating the breaking of the breakable line (2) at the moment when the packages are separated, also makes it possible to add that advantage previously mentioned in relation to the applicant's previous requests, BR102015015317-1, BR102020010957-0 and BR102021008933-4, that is, it results in constructive detail to neutralize the baling stresses, which allows for a considerable increase in the time in which the set is exposed in the field, Because, at this stage, the time of exposure to the elements, as already mentioned, is a critical factor in maintaining the integrity of the packaging.

Figure 9:
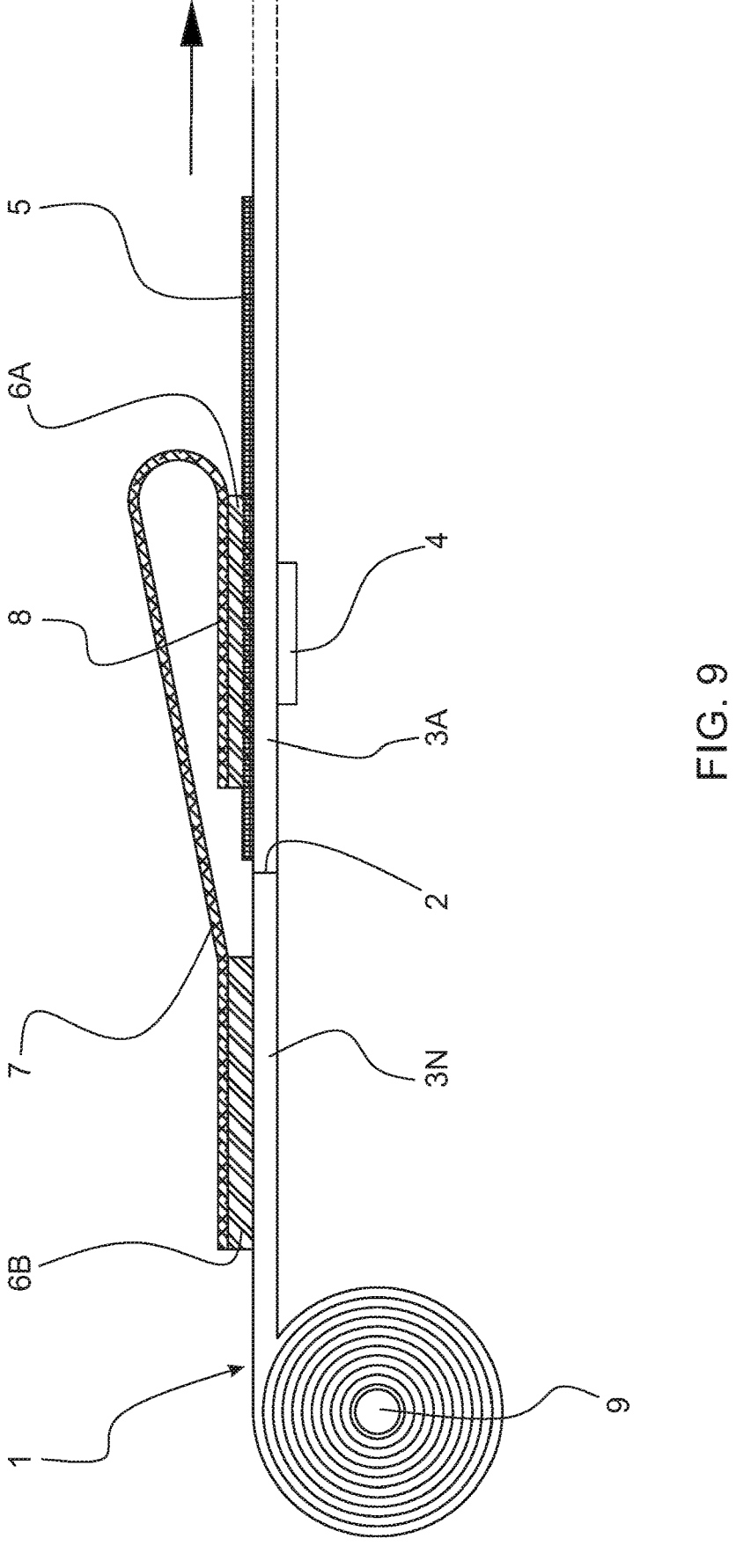
FIG. 9 represents the continuous ready-to-use packaging.

FIG. 9 represents the continuous ready-to-use packaging.

Figure 10:
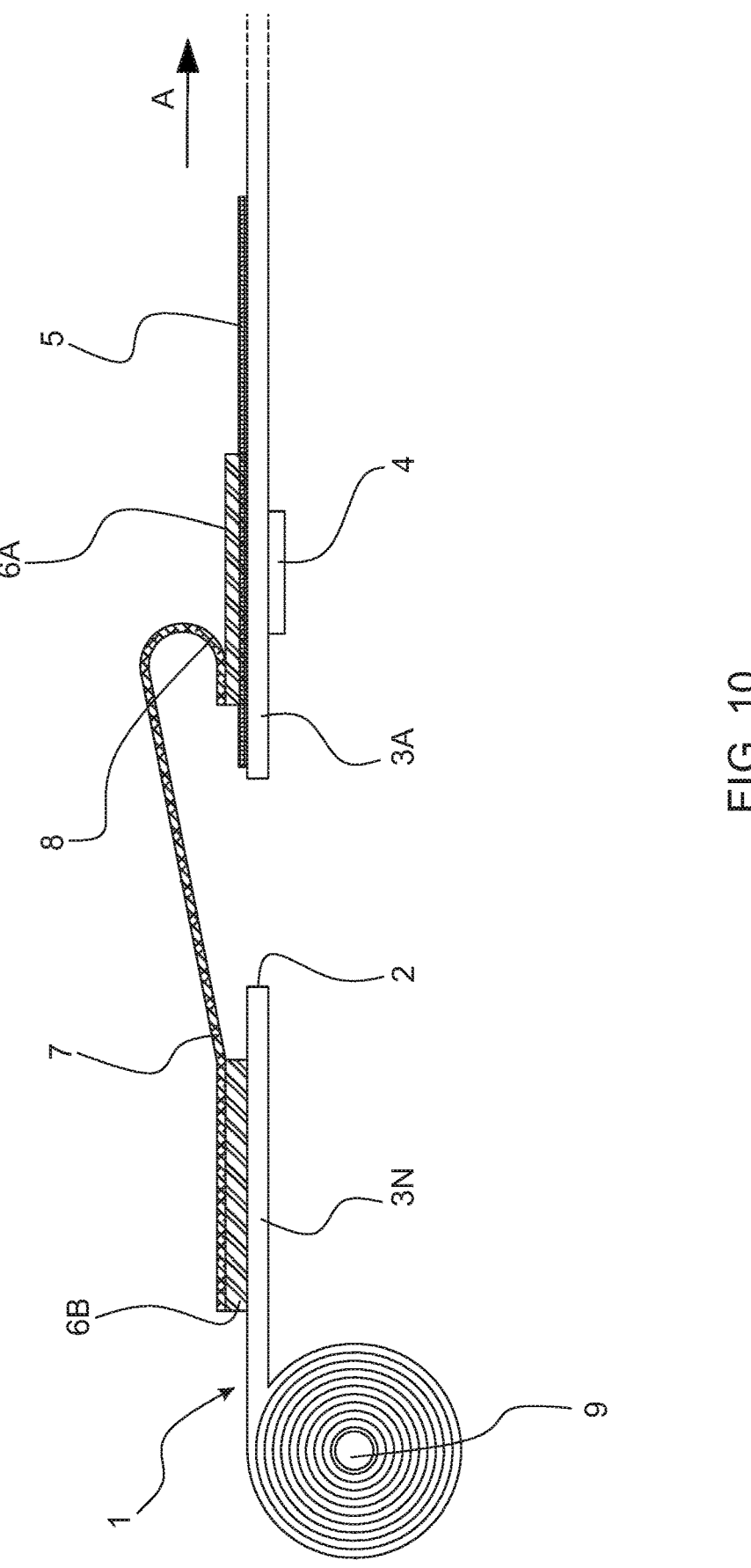
FIGS. 10 to 12 schematically represent the use of continuous packaging in a product and its application by means of dedicated equipment (not illustrated).

FIG. 10 represents the moment of separation of the packages when in use on the dedicated wrapping equipment.

Figure 11:
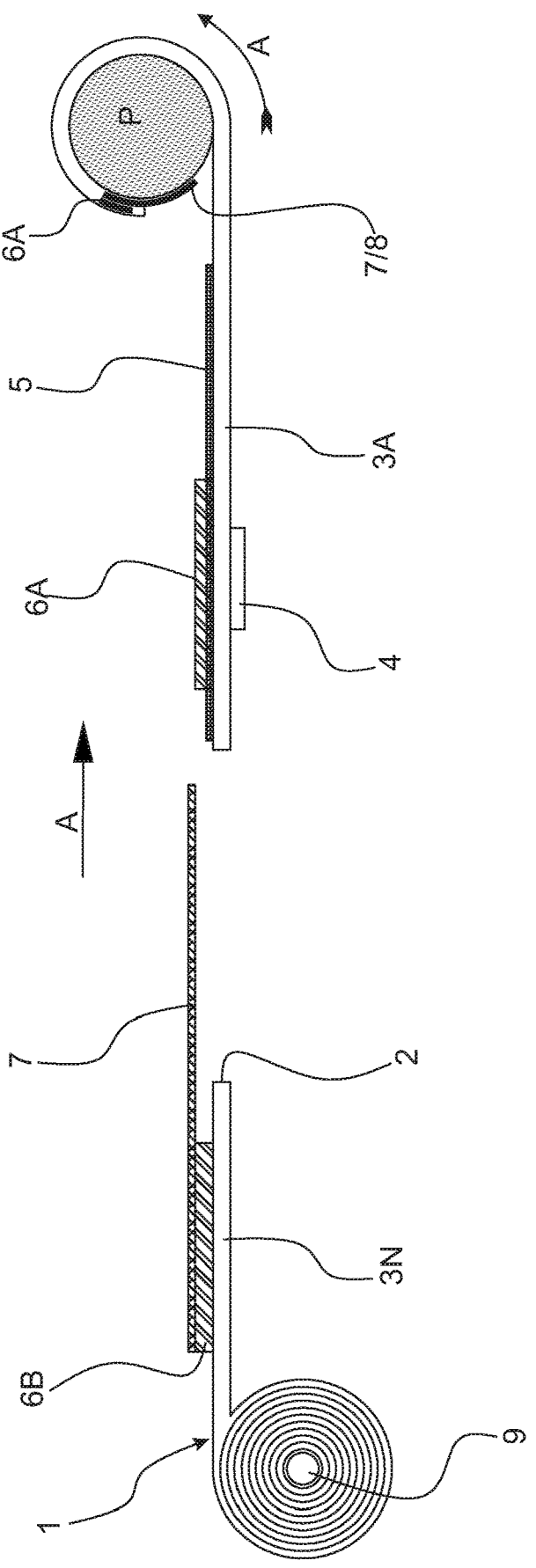
Figure 12:
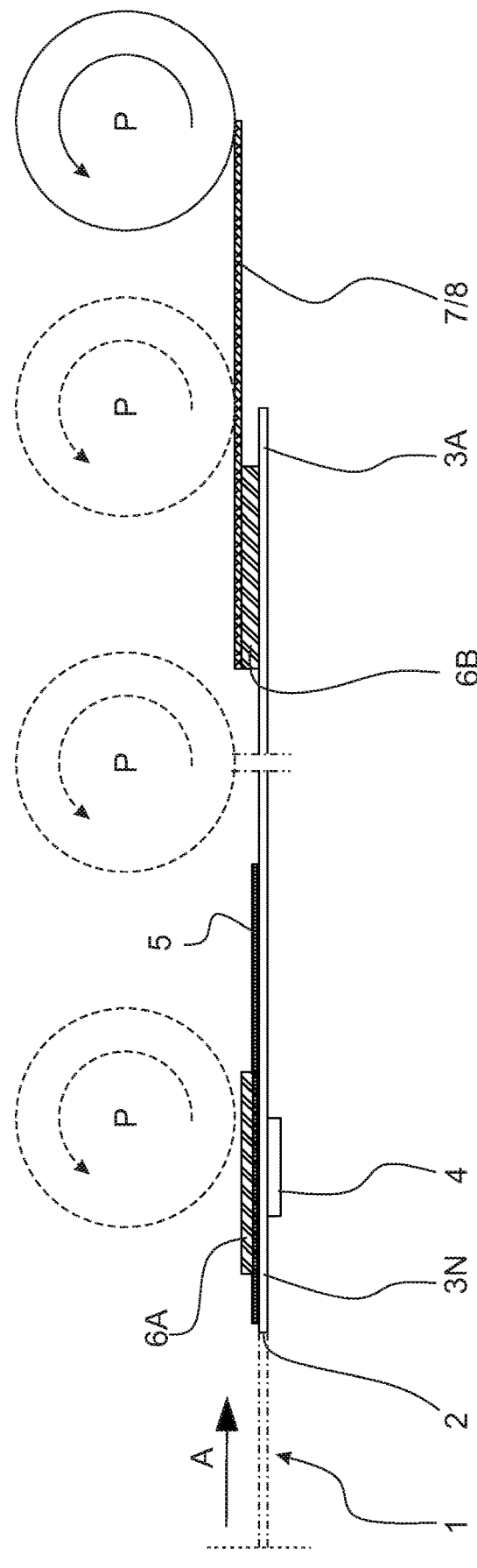

FIGS. 11 and 12 represent the total separation of the units when in use in the dedicated wrapping equipment of the package over the product (P) to be wrapped.

Therefore, observing FIGS. 9, 10, 11 and 12, we can notice that the continuous set of several packages is pulled in the direction of arrow "A" and, thus, at a given moment, the first package (3A) maintains its traction while the others are kept static (stop) temporarily, consequently, two effects occur in sequence, where the first is the breakage of the breakable line (2) and, as a result, the protective/guide strip (7) is equally pulled and begins to extend, and thus its hooked end (8) detaches from the second layer of high-adhesion adhesive (6A) and is completely free, while its opposite end is permanently held together over the high-adhesion adhesive layer (6B). The free end of the protective strip/guide (7) is the initial pull guide point during the product wrapping phase (P). In this condition, the package is wrapped over the product (P) until its opposite end, the one with the first layer of medium adhesion adhesive (5) and the layer of high adhesion adhesive (6A) completes the final closure, that is, these two adhesive layers are glued to the first segment (3A) of plastic film that was wrapped over said product (P) and, so it happens with the other segments (3N) that follow.

The invention claimed is:

1. A plastic film package for wrapping products, comprising:
   a continuous thermoplastic film having an upper surface treated to control surface tension;
   a plurality of tear lines formed in the film, the tear lines extending in a transverse direction and equidistantly spaced along a longitudinal direction defining a plurality of identical package segments;
   each package segment including:
   at least one position mark indicating a starting position of the package segment;
   a first adhesive layer of medium adhesion disposed on an upper surface of a trailing end of the package segment and extending from a respective tear line;
   a second adhesive layer of high adhesion disposed on and having a shorter length along the package segment in the longitudinal direction than that of the first adhesive layer and a shorter width than that of the package segment in the transverse direction;
   a third adhesive layer of high adhesion disposed on an upper surface at a leading end of the package segment;
   a protective guide strip formed of a plastic liner material and extending over the second adhesive layer of the package segment and the third adhesive layers of an adjacent package segment across the respective tear line, wherein the protective guide strip is permanently bonded to the third adhesive layer of the adjacent package segment and includes an opposite end folded downward and inward to form a hooked tab, the hooked tab having a siliconized surface facing the second adhesive layer of the package segment;
   wherein each tear line is surrounds the second adhesive layer of high adhesion in a plan view, each tear line including:
   a transverse intermediate straight portion extending between the second and third adhesive layers and substantially corresponding to the width of the second adhesive layer;
   parallel portions extending perpendicularly from opposite ends of the intermediate straight portion and substantially corresponding to the length of the second adhesive layer;
   deflecting portions extending transversely outward from the parallel portions so as to define a tab segment that surrounds the second adhesive layer in the plan view; and
   wherein upon pulling an initial package segment to separate the initial package segment along a tear line from a following package segment, a front end of the protective guide strip is released from the second adhesive layer of the initial package segment, while a rear end of the protective guide strip remains permanently bonded to the third adhesive layer of the following package segment.

2. The plastic film package of claim 1, wherein the treatment to control surface tension comprises a corona treatment.

3. The plastic film package of claim 1, wherein the at least one positioning mark is located on a lower surface opposite the upper surface.

4. The plastic film package of claim 3, wherein the at least one positioning mark corresponds to a location of the first adhesive layer and/or the third adhesive layer in the plan view.

5. The plastic film package of claim 3, wherein the mark is a label providing a barrier against the passage of light.

6. The plastic film package of claim 1, wherein the width of the second adhesive layer is 30% to 90% of the package segment in the transverse direction.

7. The plastic film package of claim 1, wherein the length of the second adhesive layer is 5% to 15% of the package segment in the longitudinal direction.

8. The plastic film package of claim 7, wherein a length of the first adhesion layer is 30% to 60% of the package segment in the longitudinal direction.

9. The plastic film package of claim 1, wherein length and width of the third adhesive layer are identical to the length and width of the second adhesive layer.

10. The plastic film package of claim 1, wherein the plastic is polyethylene.

11. The plastic film package of claim 10, wherein the polyethylene is "green plastic" of renewable origin.

12. The plastic film package of claim 10, wherein the plastic film package is provided on a roll.

13. A bale wrapping comprising the plastic film package of claim 1.

* * * * *